(12) United States Patent
Zheng

(10) Patent No.: US 8,539,088 B2
(45) Date of Patent: Sep. 17, 2013

(54) SESSION MONITORING METHOD, APPARATUS, AND SYSTEM BASED ON MULTICAST TECHNOLOGIES

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 12/780,255

(22) Filed: May 14, 2010

(65) Prior Publication Data

US 2010/0223380 A1 Sep. 2, 2010

Related U.S. Application Data

(63) Continuation of application No. PCT/CN2008/073087, filed on Nov. 17, 2008.

(30) Foreign Application Priority Data

Nov. 20, 2007 (CN) .......................... 2007 1 0169781
Jan. 10, 2008 (CN) .......................... 2008 1 0000981

(51) Int. Cl.
*G06F 15/16* (2006.01)

(52) U.S. Cl.
USPC ........... 709/229; 709/225; 709/227; 709/228; 709/230

(58) Field of Classification Search
USPC .................. 709/225, 227, 228, 229, 230
See application file for complete search history.

(56) References Cited

U.S. PATENT DOCUMENTS

| | | | |
|---|---|---|---|
| 8,005,065 B2* | 8/2011 | Jia et al. ........................ | 370/350 |
| 2003/0123453 A1 | 7/2003 | Ooghe | |
| 2005/0021833 A1* | 1/2005 | Hundscheid et al. ......... | 709/236 |
| 2005/0111474 A1* | 5/2005 | Kobayashi ..................... | 370/432 |
| 2005/0190765 A1 | 9/2005 | Gotoh et al. | |
| 2006/0050659 A1* | 3/2006 | Corson et al. ................. | 370/310 |
| 2007/0038743 A1* | 2/2007 | Hellhake et al. .............. | 709/224 |
| 2007/0280236 A1 | 12/2007 | Yang | |
| 2008/0095183 A1* | 4/2008 | Bijwaard et al. .............. | 370/432 |

(Continued)

FOREIGN PATENT DOCUMENTS

| | | |
|---|---|---|
| CN | 1794867 A | 6/2006 |
| CN | 1964266 A | 5/2007 |
| CN | 101047607 A | 10/2007 |

OTHER PUBLICATIONS

RFC 1122, Errata Exist, Oct. 1989, pp. 101-102.*

(Continued)

*Primary Examiner* — Rupal Dharia
*Assistant Examiner* — Van Kim T Nguyen
(74) *Attorney, Agent, or Firm* — Brinks Hofer Gilson & Lione

(57) ABSTRACT

A session monitoring method based on multicast technologies is disclosed. The method includes: obtaining information about members of a multicast group that can be joined by a user in a session, wherein the session between a network and a member of the multicast group in the session is in an alive state; and checking whether the information about the members of the multicast group in the session includes user information corresponding to the user; if the member information includes the user information corresponding to the user, determining that the session between the network and the user as the member of the multicast group in the session is alive. A session monitoring apparatus, a session monitoring system, and an Access Node (AN) based on multicast technologies are also disclosed.

4 Claims, 10 Drawing Sheets

(56) References Cited

U.S. PATENT DOCUMENTS

2008/0186913 A1* 8/2008 Ahn et al. .................... 370/329
2009/0094680 A1* 4/2009 Gupta et al. .................... 726/3
2009/0238200 A1* 9/2009 Melsen et al. ................ 370/431

OTHER PUBLICATIONS

3GPP TS23. 246 v6.6.0 3rd Generation Partnership Project;Technical Specification Group Services and System Aspects; End-to-end Quality of Service (QoS) concept and architecture(Release 6).

T. Maufer et al.: "Introduction to IP Multicast Routing; <draft-ietf-mboned-intro-multicast-03.txt>," Jul. 1997, 62 pages.

WL. Cao et al.: "PPP Over Ethernet (PPPoE) Extensions for IP multicast and broadcast; draft-caowenli-pppoe-multicast-00," Apr. 3, 2007, 14 pages.

Office action issued in corresponding European patent application No. EP08854074.5, Oct. 19, 2010, 7 pages.

Written Opinion issued in corresponding PCT application No. PCT/CN2008/073087, dated Feb. 26, 2009, total 4 pages.

Office action issued in corresponding Chinese patent application No. 200810000981.4, Mailed Mar. 6, 2012, and English translation thereof, total 19 pages.

Third Office Action issued in corresponding Chinese Patent Application No. 200810000981.4, mailed Sep. 29, 2012 and English translation thereof, 23 pages.

* cited by examiner

SESSION MONITORING METHOD, APPARATUS, AND SYSTEM BASED ON MULTICAST TECHNOLOGIES

CROSS-REFERENCE TO RELATED APPLICATIONS

This application is a continuation of International Application No. PCT/CN2008/073087, filed on Nov. 17, 2008, which claims priority to Chinese Patent Application No. 200710169781.7, filed on Nov. 20, 2007 and Chinese Patent Application No. 200810000981.4, filed on Jan. 10, 2008, all of which are hereby incorporated by reference in their entireties.

FIELD OF THE INVENTION

The present invention relates to network communication technologies, and in particular, to a session monitoring method, apparatus, and system based on multicast technologies.

BACKGROUND OF THE INVENTION

An Internet Protocol (IP) session is a session connection between a user and an IP edge device in an access network. Usually, it is necessary to perform keepalive detection for the IP session at the network side. The keepalive detection is designed to determine whether the IP session is still in the connected state, and facilitate the network side to manage the user access to the network. For example, if the IP session is still connected, the network side monitors and manages the IP session and performs charging; if the IP session is disconnected, the network side releases the resources occupied by the IP session to avoid the waste of resources.

FIG. 1 shows an IP session between the user and the network side, where "P" represents a peer of the user. In FIG. 1, n users exist at the user side; an Access Node (AN), and Edge Nodes (ENs) such as a Broadband Network Gateway (BNG) or a Broadband Remote Access Server (BRAS) exist at the network side. In FIG. 1, each user sets up an IP session with the EN through the AN. Accordingly, n users may set up n IP sessions with the EN.

In FIG. 1, when the user carries out services, the network side can provide multicast services for the user based on the multicast technology supported by the network side and the user side. In the multicast technology, if the user needs to carry out a multicast service, the user may request joining the multicast group according to the multicast group address which is notified by the network side and corresponds to the multicast service. After the network side accepts the request, the user side may obtain the network-side broadcast service information from the network side. Each multicast group may have more than one multicast group member.

Besides, in the multicast technology in the prior art, communication is performed between the user side and the network side based on the existing multicast management protocols. The existing multicast management protocols include: Internet Group Management Protocol (IGMP) applicable to IPv4, and Multicast Listener Discovery (MLD) protocol applicable to IPv6.

In the prior art, the user may carry out services based on the multicast technology. However, the keepalive detection for the IP session between the user side and the network side needs to be based on a specific IP session keepalive detection mechanism. In the existing IP session keepalive detection mechanism, the EN sends a session detection message to the corresponding user for each IP session between the user side and the network side based on the Bidirectional Forwarding Detection (BFD) protocol, for example, for the IP session between the User Equipment (UE), AN, and EN. After receiving the session detection message, the user returns a response message to the EN if the user is online.

In the prior art, few UEs at the user side support the BFD protocol. Therefore, if the user hardly supports such a protocol, the existing IP session keepalive detection mechanism can hardly monitor the IP session between the user side and the network side.

Besides, in the prior art, the IP session between the user side and the network side generally supports unicast services only, and does not support multicast services.

SUMMARY OF THE INVENTION

The embodiments of the present invention provide a method for monitoring IP sessions and/or IP multicast sessions based on multicast technologies. The method monitors the keepalive state of an IP session or an IP multicast session between a network side and a user side based on the multicast technologies supported by a majority of existing communication devices.

A session monitoring method based on multicast technologies includes:

obtaining information about members of a multicast group that can be joined by a user at the user side in a session, where the session between a network side and a member of the multicast group in the session is in the Alive state; and checking whether the information about the members of the multicast group in the session includes user information corresponding to the user, and if the member information includes the user information corresponding to the user, determining that the session between the network side and the user, as the member of the multicast group in the session, is alive.

The embodiments of the present invention provide a session monitoring apparatus based on multicast technologies. The apparatus monitors the keepalive state of a session between a network side and a user side based on the multicast technologies supported by a majority of existing communication devices.

A session monitoring apparatus based on multicast technologies includes:

a first obtaining unit, configured to obtain information about members of a multicast group that can be joined by a user at the user side in a session, where the session between a network side and a member of the multicast group in the session is in the Alive state; and a determining unit, configured to check whether the information about the members of the multicast group in the session includes user information corresponding to the user, and if the member information includes the user information corresponding to the user, determine that the session between the network and the user, as the member of the multicast group in the session, is alive.

The embodiments of the present invention provide a session monitoring system based on multicast technologies. The system monitors the keepalive state of a session between a user at the network side and a user at the user side based on the multicast technologies supported by a majority of existing communication devices.

A session monitoring system based on multicast technologies includes an AN.

The AN includes:

a second obtaining unit, configured to obtain information about members of a multicast group that can be joined by a user at the user side in a session, where a session between a network side and a member of the multicast group in the session is in the Alive state; and a second sending unit, configured to send the member information obtained by the second obtaining unit to the first obtaining unit of the session monitoring apparatus based on multicast technologies.

The technical solution provided herein is based on multicast technologies. A multicast group that can be joined by a user at the user side in an IP session or an IP multicast session is set beforehand. By monitoring the information about the members of the multicast group in the IP session or IP multicast session, the network knows whether the IP session or IP multicast session between the network side and the member of the multicast group in the IP session or IP multicast session is alive. If the information about the members of the multicast group in the IP session or IP multicast session includes the user information corresponding to the user, it is determined that the IP session or IP multicast session between the network side and the user is alive. In this way, the keepalive state of the IP session or IP multicast session is detected based on multicast technologies. For a UE that does not support the existing IP session or IP multicast session detection mechanism (for example, BFD), the embodiments of present invention can also detect the keepalive state of the IP session or IP multicast session.

DETAILED DESCRIPTION OF THE EMBODIMENTS

The technical solution under the present invention is detailed below with reference to some accompanying drawings.

The embodiments of the present invention detect the keepalive state of the IP session or IP multicast session between the user and the access network based on the multicast technologies supported by the network side and the user side, thus facilitating the user to carry out relevant services based on the existing UE and enabling the network side to monitor the IP session or IP multicast session.

Figure 2:
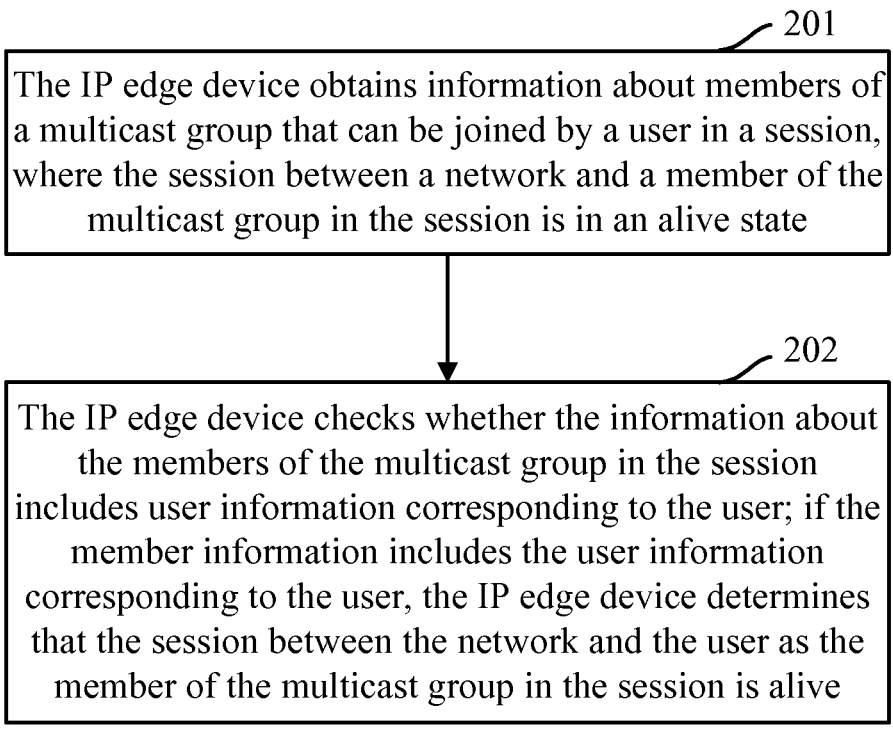
FIG. 2 is a flowchart of a method for monitoring IP sessions or IP multicast sessions based on multicast technologies in an embodiment of the present invention.

FIG. 2 is a flowchart of a method for monitoring IP sessions or IP multicast sessions based on multicast technologies in an embodiment of the present invention. The method may include the following steps:

Step 201: The IP edge device obtains information about members of a multicast group that can be joined by a user at the user side in a session, where the session between a network side and a member of the multicast group in the session is in the Alive state.

Step 202: The IP edge device checks whether the information about the members of the multicast group in the session includes user information corresponding to the user, and if the member information includes the user information corresponding to the user, the IP edge device determines that the session between the network side and the user as the member of the multicast group in the session is alive.

In the steps above, the session monitoring includes IP session monitoring and/or IP multicast session monitoring.

In the embodiments of the present invention, the IP session is monitored based on multicast technologies. Therefore, a multicast group in the IP session for detecting the keepalive state of the IP session may be set beforehand. By monitoring the members of the multicast group in the IP session, the network side detects whether the IP session corresponding to the user is alive. That is, if the user has joined the multicast group in the IP session and becomes a member of the multicast group in the IP session, the IP session between the user and the IP edge device is alive. Alternatively, the network monitors the keepalive state of a member user of the IP multicast session by monitoring the information about the members of the multicast group in the IP multicast session corresponding to an IPTV multicast service channel joined by the user. If the information about the members of the multicast group in the IP multicast session includes the user information corresponding to the user at the network side, it is determined that the member user of the IP multicast session is alive. The joining of a user into the multicast group in the IP session or IP multicast session may be reflected as follows: the information about the members of the multicast group in the IP session or IP multicast session includes the user information corresponding to the user. The user information includes at least the user identifier, and may further include the port number of the UE. In the actual application, a service provider may allocate the multicast group address corresponding to the multicast group in the IP session for the purpose of detecting the keepalive state of the IP session. For example, a service provider may allocate the addresses of the multicast groups in the IP sessions to the users in different geographical areas, depending on the geographical areas; or allocate the addresses of the multicast groups in the IP sessions to the users of different services, depending on the service type.

In the embodiments of the present invention, the IP edge device may be an EN. The EN may obtain the information about the members of the multicast group in the IP session or IP multicast session by receiving the report from the AN, or by using the functions of the EN itself.

In the embodiments of the present invention, the EN may obtain the information about the members of the multicast group in the IP session or IP multicast session by receiving the report from the AN in the following way: The AN receives a report message sent by a user at the user side, where the report message requests adding the user into the multicast group in the IP session or IP multicast session. The report message carries the user information corresponding to the user, and the address of the multicast group in the IP session or IP multicast session. The AN parses the report message to obtain the user information and the address of the multicast group in the IP session or IP multicast session, configures the user information into the pre-stored information about the members of the multicast group in the IP session or IP multicast session, and stores the configured information about the members of the multicast group in the IP session or IP multicast session. Alternatively, the AN may check whether the pre-stored information about the members of the multicast group in the IP session or IP multicast session includes the user information; if the member information includes the user information corresponding to this user, the AN retains the user information in the information about the members of the multicast group in the IP session or IP multicast session; if the member information does not include the user information corresponding to this user, the AN configures the user information into the information about the members of the multicast group in the IP session or IP multicast session, and stores the configured information about the members of the multicast group in the IP session or IP multicast session. Afterward, the AN sends the configured information about the members of the multicast group in the IP session or IP multicast session to the EN. The information about the members of the multicast group in the IP session or IP multicast session may be reported by the AN to the EN through a message based on a Layer 2 Control (L2C) mechanism.

In the embodiments of the present invention, the EN obtains the information about the members of the multicast group in the IP session or IP multicast session by using its own function in the way similar to the mode used by the AN to obtain the information about the members of the multicast group in the IP session or IP multicast session, that is, the EN receives a report message sent by the user side through the AN, where the report message requests adding the user into the multicast group in the IP session or IP multicast session. The report message carries the user information corresponding to the user, and the address of the multicast group in the IP session or IP multicast session. The EN parses the report message to obtain the user information and the address of the multicast group in the IP session or IP multicast session, configures the user information into the information about the members of the multicast group in the IP session or IP multicast session, and stores the configured information about the members of the multicast group in the IP session or IP multicast session. Alternatively, the EN checks whether the pre-stored information about the members of the multicast group in the IP session or IP multicast session includes the user information; if the member information includes the user information corresponding to this user, the AN retains the user information in the information about the members of the multicast group in the IP session or IP multicast session; if the member information does not include the user information corresponding to this user, the AN configures the user information into the information about the members of the multicast group in the IP session or IP multicast session, and stores the configured information about the members of the multicast group in the IP session or IP multicast session. After configuring the information about the members of the multicast group in the IP session or IP multicast session, the EN obtains the updated information about the members of the multicast group in the IP session or IP multicast session. Afterward, by checking the information about the members of the multicast group in the IP session or IP multicast session, the EN determines the alive member users of the IP session or IP multicast session. Therefore, the EN may perform further monitoring, e.g. charging, for the IP session or IP multicast session.

In the foregoing two modes used by the EN to obtain the information about the members of the multicast group in the IP session or IP multicast session, the AN or EN may generate the information about the members of the multicast group in the IP session or IP multicast session according to the report message reported by the user side, where the report message carries the address of the multicast group in the IP session or IP multicast session and the relevant user information. In practice, the report message may be an existing IGMP Membership Report message supported by the existing UE, or an existing MLD Multicast Listener Report message.

In the embodiments of the present invention, the network side may submit a report message actively through the user side to detect whether the user is online, namely, detect whether the member user of the IP session or IP multicast session between the user and the EN is alive; alternatively, after the user receives the query message sent by the network for querying whether the member user of the IP session or IP multicast session is alive, if the user is online, the user returns a report message to the network side so that the network side further knows that the member user of the relevant IP session or IP multicast session is alive. In practice, the query message may correspond to the report message. If the report message is an IGMP Membership Report message, the query message may be an IGMP Membership Query message; if the report message is an MLD Multicast Listener Report message, the query message may be an MLD Multicast Listener Query message. The query message needs to carry the address of multicast group in the IP session or IP multicast session. In this way, after receiving the query message, the user can know the multicast group to be queried by the query message; and the user in this multicast group needs to report the corresponding report message.

In practice, if an online user expects to leave the multicast group in the IP session or IP multicast session, the user may send a Leave Group message to the network, instructing the user to leave the multicast group in the IP session or IP multicast session. The Leave Group message carries the user information corresponding to the user, and the address of the multicast group in the IP session or IP multicast session.

In practice, if the AN is responsible for obtaining and reporting the information about the members of the multicast group in the IP session or IP multicast session, the AN parses the received Leave Group message to obtain the user information and the address of the multicast group in the IP session or IP multicast session in the message, deletes the user information from the stored information about the members of the multicast group in the IP session or IP multicast session, and then stores the information about the members of the multicast group in the IP session or IP multicast session after the deletion operation and reports the information to the EN. After receiving the information about the members of the multicast group in the IP session or IP multicast session after the deletion operation, the EN compares it with the currently stored information about the members of the multicast group in the IP session or IP multicast session to know that the previously existent user information is lacking, and therefore, determines that the corresponding IP session or IP multicast session is not alive.

In practice, if the AN is not responsible for obtaining or reporting the information about the members of the multicast group in the IP session or IP multicast session, the AN may forward the received Leave Group message to the EN. After receiving the Leave Group message, the EN parses the message to obtain the user information and the address of the multicast group in the IP session or IP multicast session in the message, and deletes the user information from the stored information about the members of the multicast group in the IP session or IP multicast session. In this way, the EN can determine that the corresponding member user of the IP session or IP multicast session is not alive.

In this embodiment, the Leave Group message may be an existing IGMP Leave Group report message or an existing MLD Multicast Listener Done message.

In practice, the IP session or IP multicast session may be interrupted, for example, due to faults of the communication link between the user side and the network side. Accordingly, in practice, a counting apparatus may be set at the network side so that the network side can detect the keepalive state of the IP session or IP multicast session in time. A counting apparatus may be set on the AN while the AN reports the information about the members of the multicast group in the IP session or IP multicast session. The counting apparatus counts how many times the AN fails to receive the report message sent by a user consecutively. If the number of consecutive times exceeds a preset threshold, the AN may delete the corresponding user information from the information about the members of the multicast group in the IP session or IP multicast session. Afterward, the AN stores the information about the members of the multicast group in the IP session or IP multicast session after the deletion operation, and reports the information to the EN.

No matter whether the AN reports the information about the members of the multicast group in the IP session or IP multicast session or the EN obtains the information actively, the set criteria for judging the keepalive state may be: After the EN obtains the information about the members of the multicast group in the IP session or IP multicast session, if the obtained information does not include the user information corresponding to a user, the EN compares the obtained information with the stored information about the members of the multicast group in the IP session or IP multicast session to determine that the corresponding IP session or IP multicast session is not alive; or, if the EN obtains the information about the members of the multicast group in the IP session or IP multicast session for a number of consecutive times, and the obtained information does not include the previously existent user information, and the number of consecutive times exceeds a preset threshold, it is determined that the corresponding member user of the IP session or IP multicast session is not alive.

After the EN determines that a member user of the IP session or IP multicast session is not alive, the EN may release the resources previously allocated to this member user. In this way, the resources are not occupied by the disconnected member user wastefully for failure of knowing the keepalive state of the member user in time.

Figure 3:
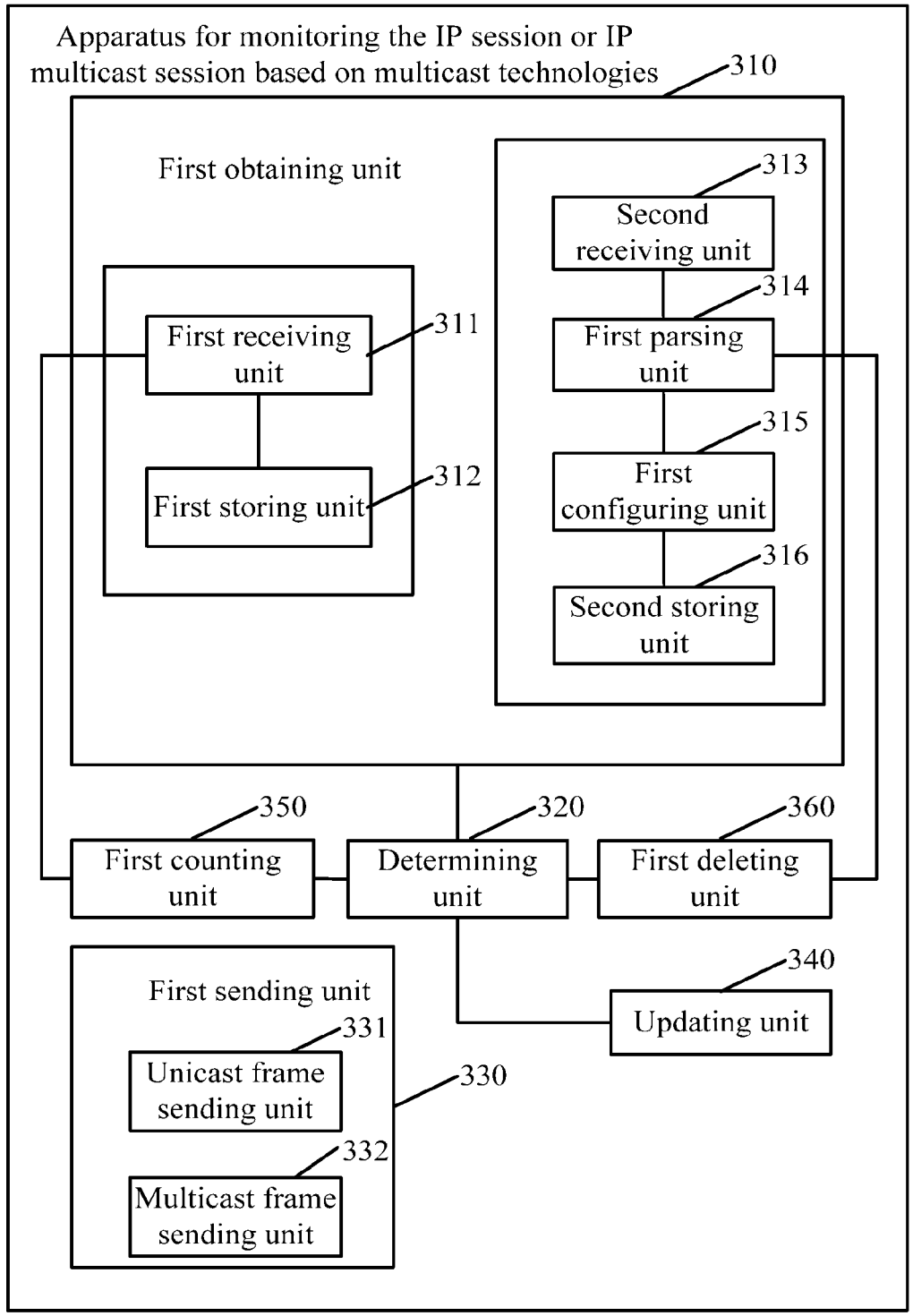
FIG. 3 shows a structure of an apparatus for monitoring IP sessions or IP multicast sessions based on multicast technologies in an embodiment of the present invention.

Accordingly, an apparatus for monitoring IP sessions or IP multicast sessions based on multicast technologies is provided in an embodiment of the present invention. FIG. 3 shows a structure of the apparatus. The apparatus monitors the keepalive state of the IP session between the user and the network, or the keepalive state of the member user of the IP multicast session. The apparatus may include:

a first obtaining unit 310, configured to obtain information about members of a multicast group that can be joined by a user at the user side in an IP session or an IP multicast session, where the IP session between a network and a member of the multicast group in the IP session is in the Alive state, or a member user of the multicast group in the IP multicast session is in the Alive state; and a determining unit 320, configured to check whether the member information obtained by the first obtaining unit 310 includes user information corresponding to the user; if the member information includes the user information corresponding to the user, determine that the IP session between the network and the user as the member of the multicast group in the IP session is alive, or determine that the member user of the multicast group in the IP multicast session is alive.

If the EN obtains the information about the members of the multicast group in the IP session or IP multicast session by receiving the member information reported by the AN, the first obtaining unit 310 may include:

a first receiving unit 311, configured to receive the information about the members of the multicast group in the IP session or IP multicast session from the AN; and a first storing unit 312, configured to store the information about the members of the multicast group in the IP session or IP multicast session, where the information is received by the first receiving unit 311.

If the EN obtains the information about the members of the multicast group in the IP session or IP multicast session actively, the first obtaining unit 310 may include:

a second receiving unit 313, configured to receive a report message sent by the user through the AN, where the report message requests adding the user into the multicast group in the IP session or IP multicast session and carries the user information and the address of the multicast group in the IP session or IP multicast session;

a second storing unit 316, which is configured to store the information about the members of the multicast group in the IP session or IP multicast session, and is empty if the EN fails to obtain the information about the members of the multicast group in the IP session or IP multicast session;

a first parsing unit 314, configured to parse the report message received by the second receiving unit 313 to obtain the user information and the address of the multicast group in the IP session or IP multicast session; and a first configuring unit 315, configured to configure the user information obtained by the first parsing unit 314 into the information about the members of the multicast group in the IP session or IP multicast session, where the information is stored by the second storing unit 316; or check whether the information about the members of the multicast group in the IP session or IP multicast session in the second storing unit 316 includes the user information, and retain the user information in the information about the members of the multicast group in the IP session or IP multicast session in the second storing unit 316, if the member information includes the user information, or configure the user information into the information about the members of the multicast group in the IP session or IP multicast session in the second storing unit 316, if the member information does not include the user information.

The second receiving unit 313 further receives the report message sent by the user periodically.

The apparatus may further include:

a first sending unit 330, configured to send the query message to the AN, where the query message is designed to query whether the member user of the IP session or IP multicast session is alive, and the query message carries the address of the multicast group in the IP session or IP multicast session.

The first sending unit 330 may include:

a unicast frame sending unit 331 and/or a multicast frame sending unit 332.

The unicast frame sending unit 331 is configured to send the unicast frame that carries the query message to the AN.

The multicast frame sending unit 332 is configured to send the multicast frame that carries the query message to the AN.

The apparatus further includes:

an updating unit 340, configured to update the keepalive state of the member user of the IP session or IP multicast session after the determining unit 320 determines that the member user of the IP session or IP multicast session is alive, where the updating unit 340 may be a timing apparatus, and the updating refers to counting time again for the member user who is determined as alive.

The first receiving unit 330 is further configured to receive the information about the members of the multicast group in the IP session or IP multicast session from the AN, where the member information does not include the user information.

The determining unit 320 is further configured to compare the member information stored by the second storing unit 316 with the member information received by the first receiving unit 330, where the member information is information about the members of a multicast group in an IP session or an IP multicast session; and determine that the IP session between the network and the user is not alive or the member user of the IP multicast session is not alive if the member information received by the first receiving unit 330 does not include the user information.

The apparatus further includes:

a first counting unit 350, configured to count the number of consecutive times the obtained information about the members of the multicast group in the IP session or IP multicast session does not include the user information corresponding to the user; and a determining unit 320, configured to monitor the number of times counted by the first counting unit 350, and determine that the member user of the IP session or IP multicast session is not alive if the count reaches the preset threshold.

The apparatus further includes a first deleting unit 360.

The second receiving unit 313 is further configured to receive a Leave Group message sent by the user through the AN, where the Leave Group message instructs the user to leave the multicast group in the IP session or IP multicast session and carries the user information and the address of the multicast group in the IP session or IP multicast session.

The first parsing unit 314 is further configured to parse the Leave Group message received by the second receiving unit 313 to obtain the user information and the address of the multicast group in the IP session or IP multicast session.

The first deleting unit 360 is configured to delete the user information obtained by the first parsing unit 314 from the information which is about the members of the multicast group in the IP session or IP multicast session and is received by the second receiving unit 313.

The determining unit 320 is further configured to compare the member information stored by the second storing unit 316 with the member information after the deletion operation performed by the first deleting unit 360, where the member information is information about the members of a multicast group in an IP session or an IP multicast session; and determine that the IP session between the network side and the user is not alive or that the member user of the IP multicast session is not alive if the information about the members of the multicast group in the IP session or IP multicast session after the deletion operation performed by the first deleting unit 360 does not include the user information.

Figure 4:
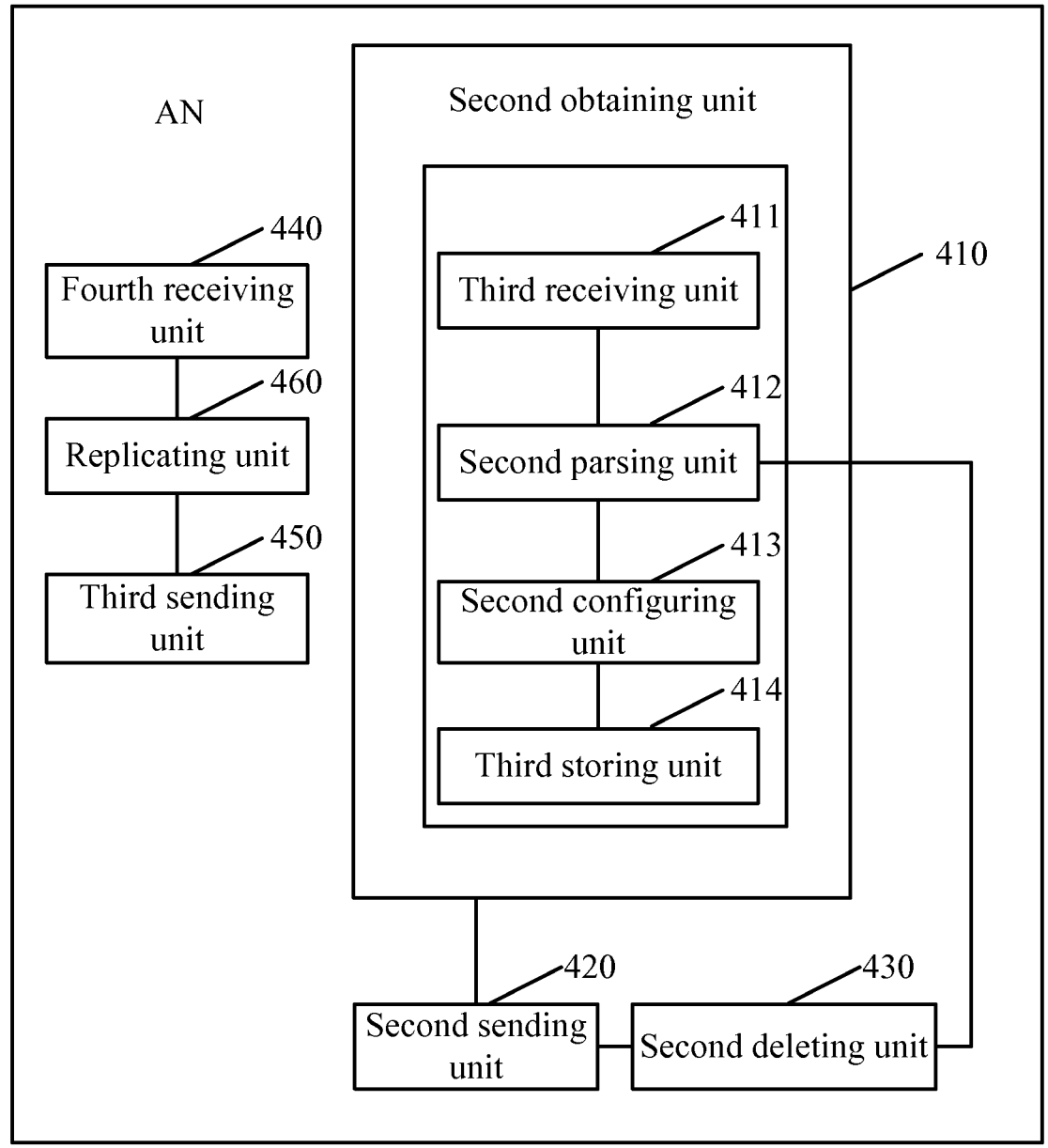
FIG. 4 shows a structure of an AN in an embodiment of the present invention.

An AN is provided in an embodiment of the present invention. As shown in FIG. 4, the AN includes:

a second obtaining unit 410, configured to obtain information about members of a multicast group that can be joined by a user in an IP session or an IP multicast session, where the IP session between a network and a member of the multicast group in the IP session is in the Alive state, or a member user of the multicast group in the IP multicast session is in the Alive state; and a second sending unit 420, configured to send the member information obtained by the second obtaining unit 410 to the first obtaining unit 310 of the session monitoring apparatus based on multicast technologies.

The second obtaining unit 410 includes:

a third receiving unit 411, configured to receive a report message sent by the user, where the report message requests adding the user into the multicast group in the IP session or IP multicast session and carries the user information and the address of the multicast group in the IP session or IP multicast session;

a second parsing unit 412, configured to parse the report message received by the third receiving unit 411 to obtain the user information and the address of the multicast group in the IP session or IP multicast session;

a third storing unit 414, which is configured to store the information about the members of the multicast group in the IP session or IP multicast session, and is empty if the AN fails to obtain the information about the members of the multicast group in the IP session or IP multicast session; and a second configuring unit 413, configured to configure the user information obtained by the second parsing unit 412 into the information about the members of the multicast group in the IP session or IP multicast session, where the information is stored by the third storing unit 414; or check whether the information about the members of the multicast group in the IP session or IP multicast session in the third storing unit 414 includes the user information, and retain the user information in the information about the members of the multicast group in the IP session or IP multicast session, if the member information includes the user information, or configure the user information into the information about the members of the multicast group in the IP session or IP multicast session in the third storing unit 414, if the member information does not include the user information.

The third receiving unit 411 is further configured to receive the report message sent by the user periodically, after which the second parsing unit 412, the second configuring unit 413 and the third storing unit 414 perform the corresponding operations.

The AN further includes a second deleting unit 430.

The third receiving unit 411 is further configured to receive a Leave Group message sent by the user, where the Leave Group message instructs the user to leave the multicast group in the IP session or IP multicast session and carries the user information and the address of the multicast group in the IP session or IP multicast session.

The second parsing unit 412 is further configured to parse the report message received by the third receiving unit 411 to obtain the user information and the address of the multicast group in the IP session or IP multicast session.

The second deleting unit 430 is configured to delete the user information from the information about the members of the multicast group in the IP session or IP multicast session in the third storing unit 414.

The third storing unit 414 is configured to store the information about the members of the multicast group in the IP session or IP multicast session after the deletion operation by overwriting the previously stored information about the members of the multicast group in the IP session or IP multicast session.

The second sending unit 420 is further configured to send the information about the members of the multicast group in the IP session or IP multicast session after the second deleting unit 430 performs the deletion. The IP edge device such as the EN may receive the information.

The AN further includes:

a fourth receiving unit 440, configured to receive the query message sent by the IP edge device, where the query message is designed to query whether the member user of the IP session or IP multicast session is alive, the query message carries the address of the multicast group in the IP session or IP multicast session, and the query message is carried in a layer-2 unicast frame; and a third sending unit 450, configured to send the unicast frame that is received by the fourth receiving unit 440 and carries the query message to a user connected with the AN.

The AN may further include:

a fourth receiving unit 440, configured to receive the query message sent by the IP edge device, where the query message is designed to query whether the member user of the IP session or IP multicast session is alive, the query message carries the address of the multicast group in the IP session or IP multicast session, and the query message is carried in a layer-2 multicast frame;

a replicating unit 460, configured to replicate the query message received by the fourth receiving unit 440; and a third sending unit 450, configured to send the query message replicated by the replicating unit 460 to multiple users connected with the AN respectively.

It should be emphasized that, in the embodiments of the present invention, the AN reports the information about the members of the multicast group in the IP session or IP multicast session, thus massively reducing the traffic of the messages that need to be transmitted between the EN and the AN for detecting the keepalive state of the member user of the IP session or IP multicast session, massively reducing the workload of the EN in detecting the keepalive state of the member user of the IP session or IP multicast session, and reducing the load of the EN.

A system for monitoring IP sessions or IP multicast sessions based on multicast technologies is provided in an embodiment of the present invention. The system may include the foregoing apparatus for monitoring IP sessions or IP multicast sessions based on multicast technologies and the foregoing AN. The AN sends the generated information about the members of the multicast group in the IP session or IP multicast session to the first obtaining unit of the apparatus for monitoring the session based on multicast technologies, and the apparatus for monitoring the IP session or IP multicast session based on multicast technologies receives the member information. The apparatus for monitoring the IP session or IP multicast session based on multicast technologies may be set on an EN.

Figure 1:
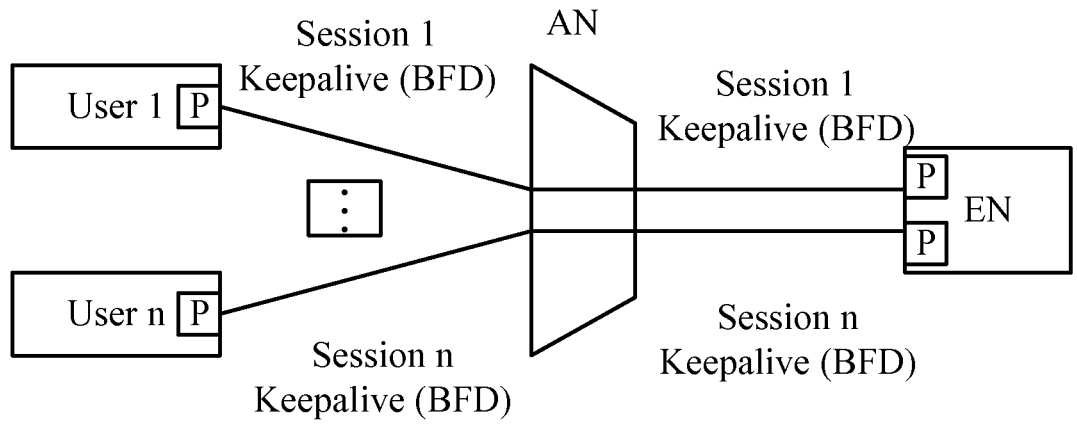
FIG. 1 shows an IP session or an IP multicast session between a user and a network side.

As shown in FIG. 1, in the IP session monitoring method based on multicast technologies in an embodiment of the present invention, the AN reports the information about the members of the multicast group in the IP session to the EN. The benefits brought by the technical solution under the present invention are described below. In FIG. 1, each EN supports 5000 ANs, and each AN supports 1000 Digital Subscriber Lines (DSLs). Each DSL supports four IP sessions, and each EN needs to support 20,000,000 IP sessions. That is, the EN needs to detect the keepalive state of 20,000,000 IP sessions. Therefore, the EN bears a heavy load. In the existing IP session keepalive detection mechanism, the EN needs to detect the keepalive state of every IP session. Therefore, the performance of the EN in processing the IP session in time is reduced, and the processing delay is long. Moreover, the detection between the EN and the AN is based on each IP session, which tends to cause a traffic bottleneck between the AN and the EN and reduce the system traffic.

By contrast, in the embodiments of the present invention, the IP session detection is based on the preset multicast group in the IP session; the AN monitors the members of the multicast group in the IP session, and reports the member information to the EN. Therefore, a relatively small amount of information needs to be transmitted between the AN and the EN to make the EN know the member information of the multicast group in the IP session and further know the keepalive state of the IP session, without requiring the EN to detect each IP session separately. Therefore, the message traffic between the EN and the AN is reduced, and the load on the EN is reduced, and the system performance is improved.

Moreover, the network monitors the keepalive state of a member user of the IP multicast session by monitoring the information about the members of the multicast group in the IP multicast session corresponding to an IPTV multicast service channel joined by the user. If the information about the members of the multicast group in the IP multicast session includes the user information corresponding to the user, it is determined that the member user of the IP multicast session is alive. In this way, the keepalive state of the IP multicast session is detected based on multicast technologies.

The technical solution under the present invention and the application of the technical solution are detailed below with reference to some exemplary embodiments.

In the embodiments of the present invention, the practice of defining a multicast group in an IP session may be: Multiple IP sessions on multiple physical lines that pass through the same AN to the Customer Premises Equipment (CPE) are defined as an IP session group; or multiple IP sessions on multiple physical lines that pass through the same AN to a Routing Gateway (RG) are defined as an IP session group; or multiple IP sessions on multiple physical lines from the same AN to a UE are defined as an IP session group; or multiple IP sessions on the same physical line that passes through the AN to the UE are defined as an IP session group. Each IP session group corresponds to a multicast group in the IP session.

The physical line may be a wired or wireless line.

In the embodiments of the present invention, an IP multicast session is defined as a multicast session connection set up between the user and the IP edge device on the access network. The network generally needs to perform keepalive detection for the IP multicast session to determine whether the user exists in the IP multicast session, thus facilitating the network to manage the user access to the network. For example, for a user still engaged in the IP multicast session, the network monitors and manages the user and performs charging; for a user outside the IP multicast session, the network releases the resources occupied by the user of the IP multicast session to avoid the waste of resources. Each IP multicast session corresponds to a multicast group in an IP multicast session. The address of the multicast group in the IP multicast session corresponds to an IPTV multicast service channel. Different IPTV multicast service channels correspond to different addresses of multicast groups in the IP multicast sessions.

First Embodiment

In the first embodiment, a specific multicast group in an IP session is set dynamically or statically in the EN and the UE in the stage of setting up an IP session. The user joins the multicast group in the IP session, and the EN obtains the information about the members of the multicast group in the IP session by receiving the report from the AN, and knows the keepalive state of the IP session.

Alternatively, in the stage of setting up an IP multicast session, the user joins the IP multicast group corresponding to the IPTV multicast service channel. The EN obtains the information about the members of the IP multicast group corresponding to the IPTV multicast service channel, thus setting up an IP multicast session and knowing the keepalive state of the member user of the IP multicast session.

Figure 5:
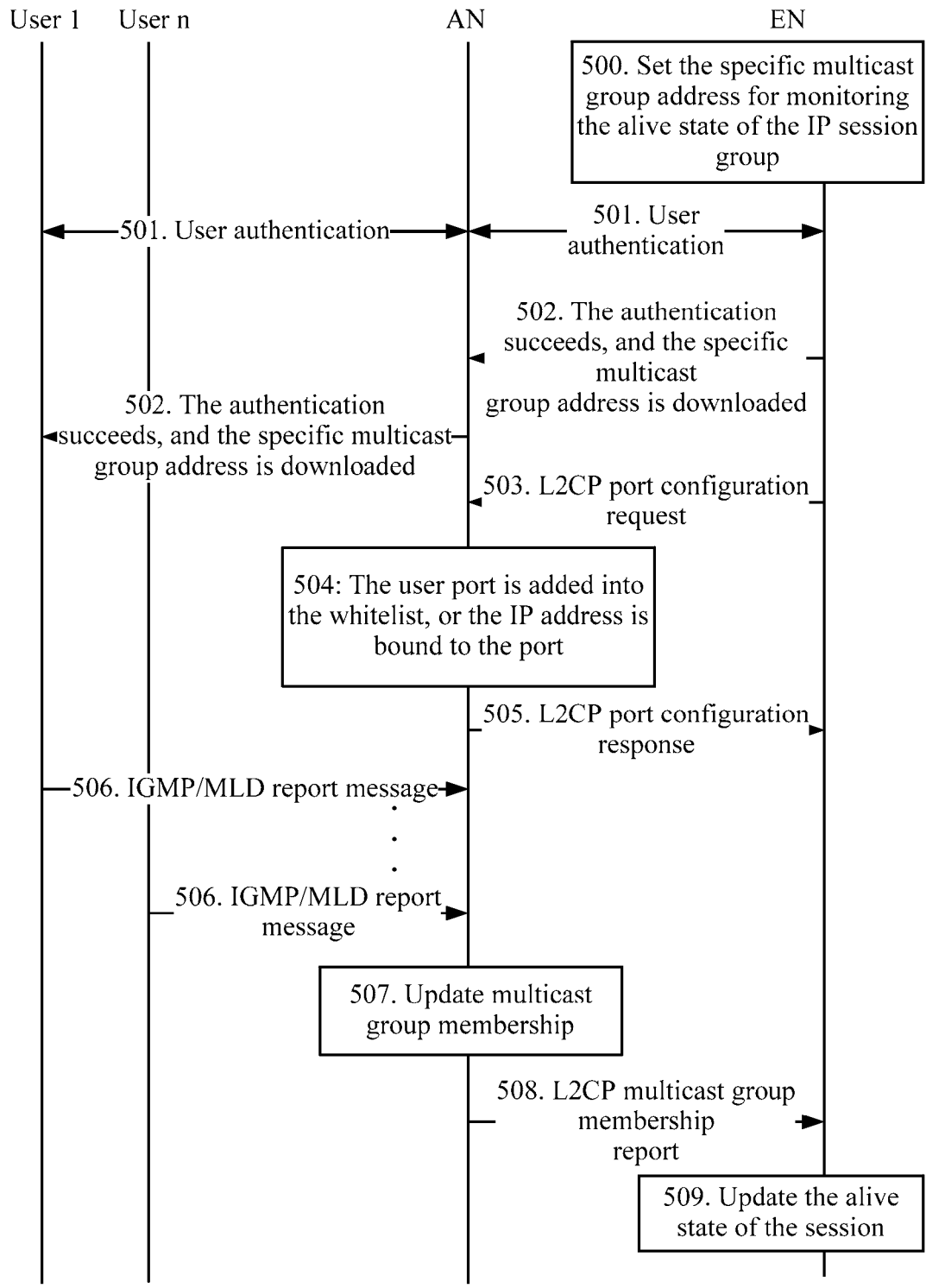
FIG. 5 is a flowchart of monitoring IP sessions or IP multicast sessions based on multicast technologies in a first embodiment of the present invention.

FIG. 5 is a flowchart of monitoring IP sessions or IP multicast sessions based on multicast technologies in the stage of setting up a session in the first embodiment of the present invention. The process may include the following steps:

For the process of monitoring the IP multicast session based on multicast technologies, steps 500-502 are optional.

Step 500: An address of a specific multicast group in the IP session or IP multicast session is set on the EN for the purpose of monitoring the keepalive state of the IP session group or IP multicast session group.

Step 501: The EN authenticates the user.

Step 502: After the user passes the authentication, the EN downloads the set address of the specific multicast group in the IP session or IP multicast session to the user dynamically. The address of the specific multicast group in the IP session or IP multicast session is designed to monitor the keepalive state of the IP session or IP multicast session.

In steps 501-502, a set address of the specific multicast group in the IP session or IP multicast session is configured for the UE dynamically. In practice, the set address of the specific multicast group in the IP session or IP multicast session may be configured on the UE statically.

Steps 503-504: The EN sends a port configuration request message based on the L2C protocol, requesting the AN to set the Access Control List (ACL) attribute of one or more ports (physical port or logical port) corresponding to the user and the address of the specific multicast group in the IP session or IP multicast session or the IP multicast address corresponding to an IPTV multicast service channel to "Allowed", namely, "whitelisted". That is, the user is allowed to join the specific multicast group in the IP session or IP multicast session or the IP multicast group corresponding to an IPTV multicast service channel from one or more ports (physical port or logical port).

Alternatively, the EN sends a port configuration request message based on the L2C protocol, requesting the AN to bind the IP address corresponding to the user to one or more ports (physical port or logical port). That is, the user is allowed to join the specific multicast group in the IP session or the IP multicast group corresponding to an IPTV multicast service channel from one or more ports (physical port or logical port).

Step 505: After completion of the port configuration, the AN returns a port configuration response message to the EN through the L2C protocol.

Step 506: As soon as the IP session or IP multicast session of the user is set up, the IP session or IP multicast session peer of the user sends a multicast report message, requesting joining the specific multicast group in the IP session or IP multicast session which is set in step 500 or access the IP multicast address corresponding to an IPTV multicast service channel.

For the IGMP, the report message is an IGMP Membership Report message; for the MLD, the report message is an MLD Multicast Listener Report message.

Step 507: The AN updates the multicast group membership.

The AN receives the report message, extracts the member information from the report message, adds the corresponding user into a specific multicast group in an IP session or an IP multicast group corresponding to an IPTV multicast service channel, and maintains the membership table of the specific multicast group in the IP session or the membership table of the IP multicast group corresponding to an IPTV multicast service channel.

Step 508: Through the L2C protocol, the AN reports the content of the membership table between the user and the specific multicast group in the IP session or IP multicast session or the membership table of the IP multicast group corresponding to an IPTV multicast service channel to the EN. The content of the membership table may be reported periodically or reported when the AN receives a report message.

The corresponding IP multicast session is set up when the EN obtains the membership table between the user and the IP multicast group corresponding to an IPTV multicast service channel. When an IP multicast session is set up, the IP multicast group corresponding to the IPTV multicast service channel is called a multicast group in the IP multicast session.

Step 509: The EN updates the keepalive state of the member user of the IP session or IP multicast session.

According to the content of the membership table between the user and the specific multicast group in the IP session or IP multicast session, which is reported by the AN, the EN judges whether the IP session of the corresponding user of the corresponding IP session group or IP multicast session group is alive to update the keepalive state of the corresponding IP session, or judges whether the member user of the corresponding IP multicast session is alive to update the keepalive state of the corresponding IP multicast session.

The criteria of judgment are as follows:

If a user does not exist in the membership table or the user fails to appear in the membership table for a set number of consecutive times, the EN determines that the corresponding IP session is not alive or the corresponding member user of the IP multicast session is not alive; otherwise, the EN determines that the IP session is alive or the member user of the IP multicast session is alive.

The process of the first embodiment ends.

Second Embodiment

In the second embodiment, the EN obtains the information about the members of the multicast group in the IP session or IP multicast session by receiving the report from the AN in the session communication process, and monitors the IP session or IP multicast session between the EN and each user based on the information about the members of the multicast group in the IP session or IP multicast session.

Figure 6:
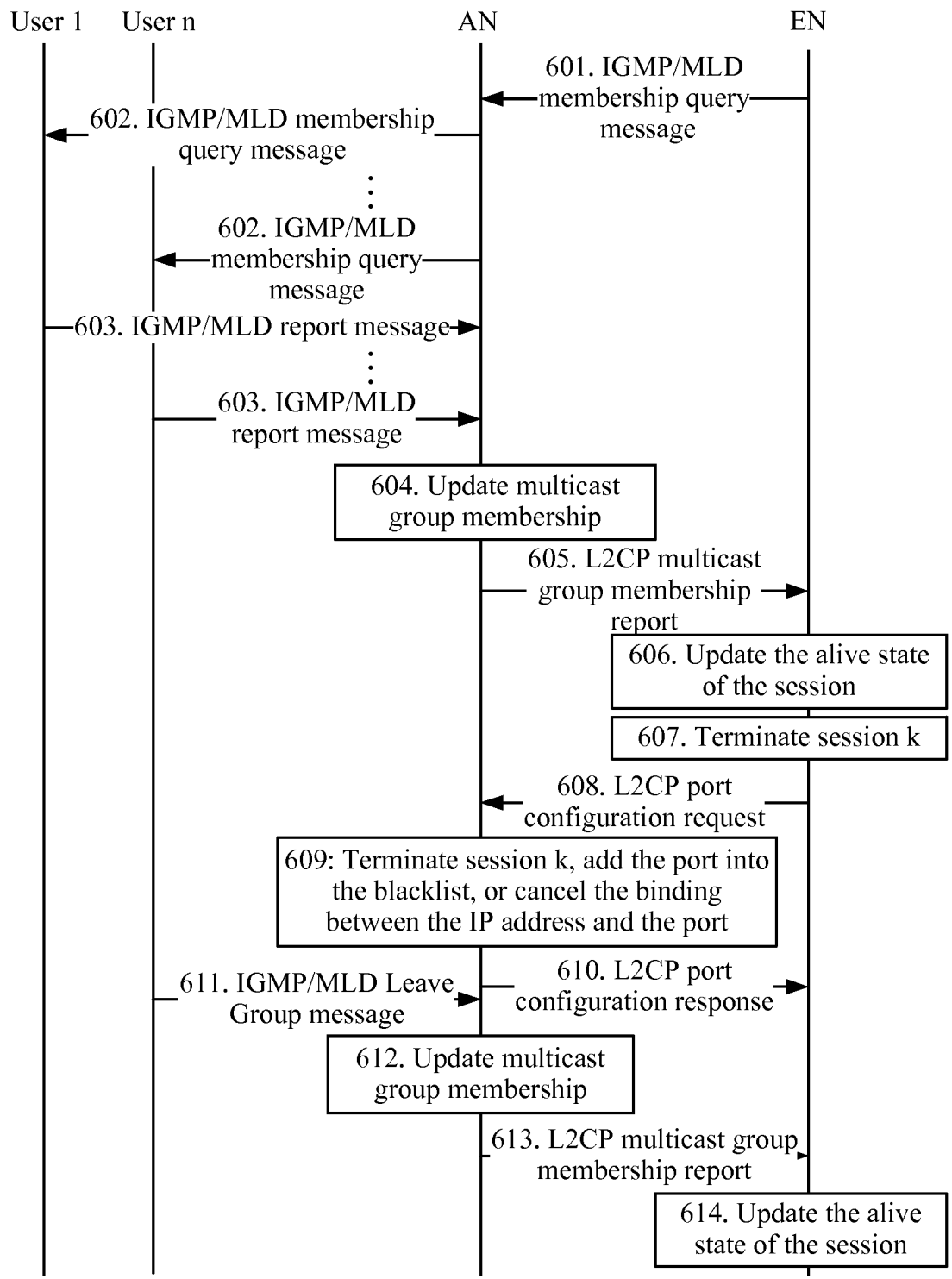
FIG. 6 is a flowchart of monitoring IP sessions or IP multicast sessions based on multicast technologies in a second embodiment of the present invention.

FIG. 6 is a flowchart of monitoring IP sessions or IP multicast sessions based on multicast technologies in the session communication process in the second embodiment of the present invention. The process may include the following steps:

Step 601: The session group peer of the EN sends a query message to all users at the address of the specific multicast group in the IP session or IP multicast session by means of a specific multicast query mode.

In practice, the query message may be an IGMP Membership Query message or an MLD Multicast Listener Query message, and may be sent at preset intervals. This step is optional. In the second embodiment, the query message carries the address of the multicast group in the IP session or IP multicast session which is set in the EN in the first embodiment.

In the second embodiment, the EN needs to send the query message to all users, and the query message may be sent through a layer-2 multicast frame or broadcast frame.

Step 602: The AN receives the query message sent by the EN, replicates the query message according to the relation between the user port (physical port or logical port) in the ACL and the address of the specific multicast group in the IP session or IP multicast session, and sends the query message to all users that are connected to the AN and located at the address of the specific multicast group in the IP session or IP multicast session.

In the second embodiment, it is assumed that the AN supports the multicast management protocol listening function, that is, the AN can identify the IGMP query message or MLD query message.

Step 603: After receiving the query message sent by the AN, the online user sends a report message which requests joining the multicast group in the IP session or IP multicast session. Alternatively, in the session communication process, the session peer of the user sends multicast report messages actively at intervals, requesting joining the set specific multicast group in the IP session or IP multicast session.

Alternatively, in the session communication process, the session side of the user sends multicast report messages actively at intervals, requesting joining the multicast group in the IP session or IP multicast session.

For the former, steps 601 and 602 are mandatory; for the latter, neither step 601 nor step 602 is required.

In practice, if the query message is an IGMP Membership Query message, the report message may be an IGMP Membership Report message; if the query message is an MLD Multicast Listener Query message, the report message may be an MLD Multicast Listener Report message.

In the second embodiment, the report message carries the user information and the address of the multicast group in the IP session or IP multicast session.

Step 604: The AN receives the report message sent by the user, and adds the user information into the pre-stored information about the members of the multicast group in the IP session or IP multicast session to update the information about the members of the multicast group in the IP session or IP multicast session.

In the second embodiment, the AN obtains the information about the members of the multicast group in the IP session or IP multicast session in this way: The AN parses the report message to obtain the user information and the address of the multicast group in the IP session or IP multicast session, configures the user information into the information about the members of the multicast group in the IP session or IP multicast session, and stores the information about the members of the multicast group in the IP session or IP multicast session with the configured user information. If the pre-stored information about the members of the multicast group in the IP session or IP multicast session on the AN is not empty, the AN may check whether the stored information about the members of the multicast group in the IP session or IP multicast session includes the user information; if the member information includes the user information, the AN retains the information about the members of the multicast group in the IP session or IP multicast session; if the member information does not include the user information, the AN configures the user information into the information about the members of the multicast group in the IP session or IP multicast session, and therefore, the corresponding user joins the multicast group in the IP session or IP multicast session. In practice, a membership table may be used to reflect the information about the members of the multicast group in the IP session or IP multicast session. The membership table may include the address of the multicast group in the IP session or IP multicast session and the corresponding user information. In a membership table, the member information of multiple different multicast groups in the IP session or IP multicast session may be maintained.

In the process described above, the EN sends the query message once. In practice, the EN may send the query message periodically, and the AN may count the number of consecutive times of failing to receive the report message sent by the user according to the number of times of sending the query message. If the count reaches a preset threshold, the AN deletes the corresponding user information from the information about the members of the multicast group in the IP session or IP multicast session on the AN, and stores the information about the members of the multicast group in the IP session or IP multicast session after the deletion operation.

Step 605: The AN reports the information about the members of the multicast group in the IP session or IP multicast session to the EN based on the L2C protocol.

In the second embodiment, the AN reports the information about the members of the multicast group in the IP session or IP multicast session immediately after completion of step 604.

After the EN receives the information about the members of the multicast group in the IP session or IP multicast session, the EN needs to process the member information properly. In practice, the AN may be set not to report the member information immediately after completion of step 604, but to report the information about the members of the multicast group in the IP session or IP multicast session periodically, thus further reducing the amount of information to be transmitted between the AN and the EN and reducing the load on the EN.

Step 606: The EN receives the information about the members of the multicast group in the IP session or IP multicast session from the AN, and updates the keepalive state of the IP session or IP multicast session.

In the second embodiment, after the EN receives the information about the members of the multicast group in the IP session or IP multicast session from the AN, the EN may determine the keepalive state of the relevant IP session or the relevant member user of the IP multicast session by checking the user information and the address of the multicast group in the IP session or IP multicast session in the received member information, and store the information about the members of the multicast group in the IP session or IP multicast session.

In the case that the user is previously online but gets offline later, if the information about the members of the multicast group in the IP session or IP multicast session is pre-stored on the EN, the EN may compare the received member information with the stored member information. If the received member information does not include the previously existent user information, it is determined that the corresponding IP session is not alive or that the corresponding member user of the IP multicast session is not alive. Alternatively, the counting unit in the EN counts the number of consecutive times the received member information does not include the user information, and, if the count exceeds the preset threshold, it is determined that the corresponding IP session is not alive or that the corresponding member user of the IP multicast session is not alive, and the resources previously allocated to the IP session or the member user of the IP multicast session can be released.

For the alive IP session or alive member user of the IP multicast session, the EN may update the keepalive state of the IP session or IP multicast session, for example, perform countdown for the keepalive state of the IP session or the member user of the IP multicast session again.

Step 607: For some special reasons (for example, user in arrears), the EN terminates the IP session or IP multicast session of the member user (for example, IP session k or IP multicast session of member user k).

Steps 608-609: The EN sends a port configuration request message based on the L2C protocol, requesting the AN to set the ACL attribute of the port (physical port or logical port) corresponding to the user of IP session k or member user k of the IP multicast session and the address of the specific multicast group in the IP session or IP multicast session to "Not Allowed", namely, "blacklisted". That is, the user of the IP session k or member user k of the IP multicast session is not allowed to access the address of the specific multicast group in the IP session or IP multicast session from the corresponding port (physical port or logical port).

Alternatively, the EN sends a port configuration request message based on the L2C protocol, requesting the AN to cancel the binding between the IP address corresponding to the user of IP session k or member user k of the IP multicast session and the port (physical port or logical port). That is, the user of the IP session k or member user k of the IP multicast session corresponding to the IP address is not allowed to access the address of the specific multicast group in the IP session or IP multicast session from the port (physical port or logical port).

Step 610: After completion of the port configuration, the AN returns a port configuration response message to the EN through the L2C protocol.

Step 611: The user requests logging out, and sends a Leave Group message to the network. The message indicates that the user leaves the multicast group in the IP session or IP multicast session.

In practice, the Leave Group message may be an IGMP Leave Group message or an MLD Multicast Listener Done message.

In the second embodiment, the Leave Group message carries the user information corresponding to the user and the address of the multicast group in the IP session or IP multicast session.

Step 612: After receiving the Leave Group message sent by the user, the AN updates the stored information about the members of the multicast group in the IP session or IP multicast session.

In the second embodiment, the AN parses the Leave Group message to obtain the user information and the address of the multicast group in the IP session or IP multicast session in the message, and deletes the user information from the stored information about the members of the multicast group in the IP session or IP multicast session.

Steps 613-614 are similar to steps 605-606 described above.

For step 614, if the IP multicast session has no member user, it is necessary to terminate the IP multicast session and release the resources allocated to the IP multicast session.

The process of the second embodiment ends.

Figure 7:
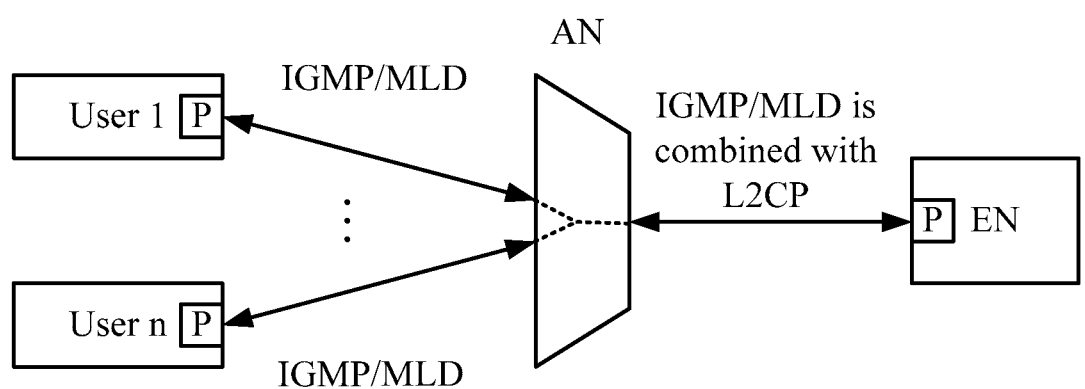
FIG. 7 shows a keepalive detection broadcast mechanism of IP sessions or IP multicast sessions in the second embodiment of the present invention.

FIG. 7 shows a multicast mechanism for detecting the keepalive state of the IP session or IP multicast session in the first and second embodiments of the present invention. In FIG. 7, the "P" on the EN side represents the peer of the user in the IP session group or IP multicast session, and the "P" on the user side represents the peer of the EN in the IP session or IP multicast session group. This embodiment is based on the following assumptions: Sessions 1-$n$ make up a session group; the peer of the EN in the session group supports the function of session group keepalive detection under the present invention, and corresponds to the session peer of 1-$n$ users; and the AN supports the IGMP/MLD listening function.

As shown in FIG. 7, in the first and second embodiments of the present invention, the network detects the keepalive state of the IP session between the network and the user based on the preset address of the multicast group in the IP session for the purpose of IP session detection. In the first and second embodiments, the AN monitors the members of the multicast group in the IP session, and reports the obtained information about the members of the multicast group in the IP session to the EN. The information about the members of the multicast group in the IP session may be reported by the AN to the EN through a message by means of an L2C mechanism, thus massively reducing the information to be transmitted between the AN and the EN and reducing the load on the EN.

Third Embodiment

In the third embodiment, a specific multicast group in an IP session or an IP multicast session is set dynamically or statically in the EN and the UE in the stage of setting up the IP session. The user joins the multicast group in the IP session or IP multicast session, and the EN obtains the information about the members of the multicast group in the IP session or IP multicast session, and knows the keepalive state of the IP session or IP multicast session.

Figure 8:
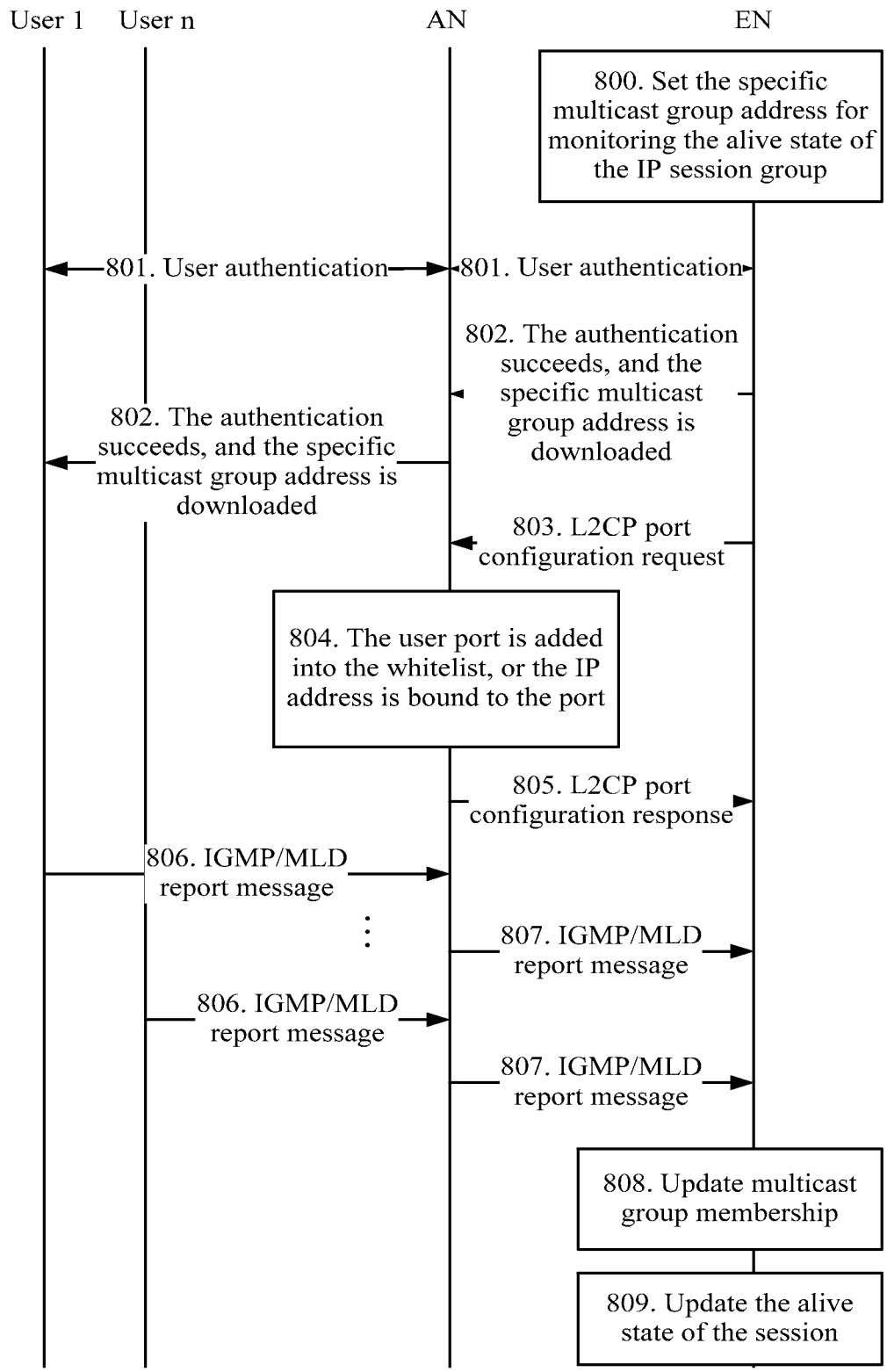
FIG. 8 is a flowchart of monitoring IP sessions or IP multicast sessions based on multicast technologies in a third embodiment of the present invention.

FIG. 8 is a flowchart of monitoring IP sessions or IP multicast sessions based on multicast technologies in the stage of setting up a session in the third embodiment of the present invention. The process may include the following steps:

For the process of monitoring the IP multicast session based on multicast technologies, steps 800-802 are optional.

Step 800: Set the specific multicast group address for monitoring the Alive state of the IP session group.

Steps 801-802 are the same as steps 501-502 in the first embodiment; and the address of the specific multicast group in the IP session is configured for the UE dynamically or statically.

Steps 803-804: The EN sends a port configuration request message based on the L2C protocol, requesting the AN to set the ACL attribute of one or more ports (physical port or logical port) corresponding to the user and the address of the specific multicast group in the IP session or the IP multicast address corresponding to an IPTV multicast service channel to "Transparent Transmission", namely, "graylisted". That is, the AN is allowed to forward the multicast management protocol message sent by the user through one or more ports (physical port or logical port).

Alternatively, the EN sends a port configuration request message based on the L2C protocol, requesting the AN to bind the IP address corresponding to the user to one or more ports (physical port or logical port). That is, the user corresponding to the IP address is allowed to send a multicast management protocol message through one or more ports (physical port or logical port), and the message is forwarded by the AN.

Step 805: After completion of the port configuration, the AN returns a port configuration response message to the EN through the L2C protocol.

Step 806: As soon as the IP session of the user is set up, the IP session peer of the user sends a multicast report message, requesting joining the specific multicast group in the IP session set in step 800 or access the IP multicast address corresponding to an IPTV multicast service channel.

For the IGMP, the report message is an IGMP Membership Report message; for the MLD, the report message is an MLD Multicast Listener Report message.

Step 807: The AN forwards the multicast report message to the EN.

Step 808: The EN updates the multicast group membership.

The EN receives the report message, extracts the member information from the report message, adds the corresponding user into a specific multicast group in the IP session or the IP multicast group corresponding to an IPTV multicast service channel, and maintains the membership table of the specific multicast group.

Now the corresponding IP multicast session is set up. After an IP multicast session is set up, the IP multicast group corresponding to the IPTV multicast service channel is called a multicast group in an IP multicast session.

Step 809: The EN updates the keepalive state of the IP session or IP multicast session.

According to the membership table between the user and the address of the specific multicast group in the IP session or IP multicast session, the EN judges whether the IP session of the corresponding user of the corresponding IP session group is alive to update the keepalive state of the corresponding IP session, or judges whether the member user of the corresponding IP multicast session is alive to update the keepalive state of the corresponding IP multicast session. The judgment criteria are as follows:

If a user does not exist in the membership table or the user fails to appear in the membership table for a set number of consecutive times, the EN determines that the corresponding IP session is not alive or the corresponding member user of the IP multicast session is not alive; otherwise, the EN determines that the IP session is alive or the member user of the IP multicast session is alive.

The process of the third embodiment is ended.

Fourth Embodiment

In the fourth embodiment, the EN obtains the information about the members of the multicast group in the IP session or IP multicast session in the session communication process, and monitors the keepalive state of the IP session or IP multicast session in the multicast group according to the information about the members of the multicast group in the IP session or IP multicast session.

Figure 9:
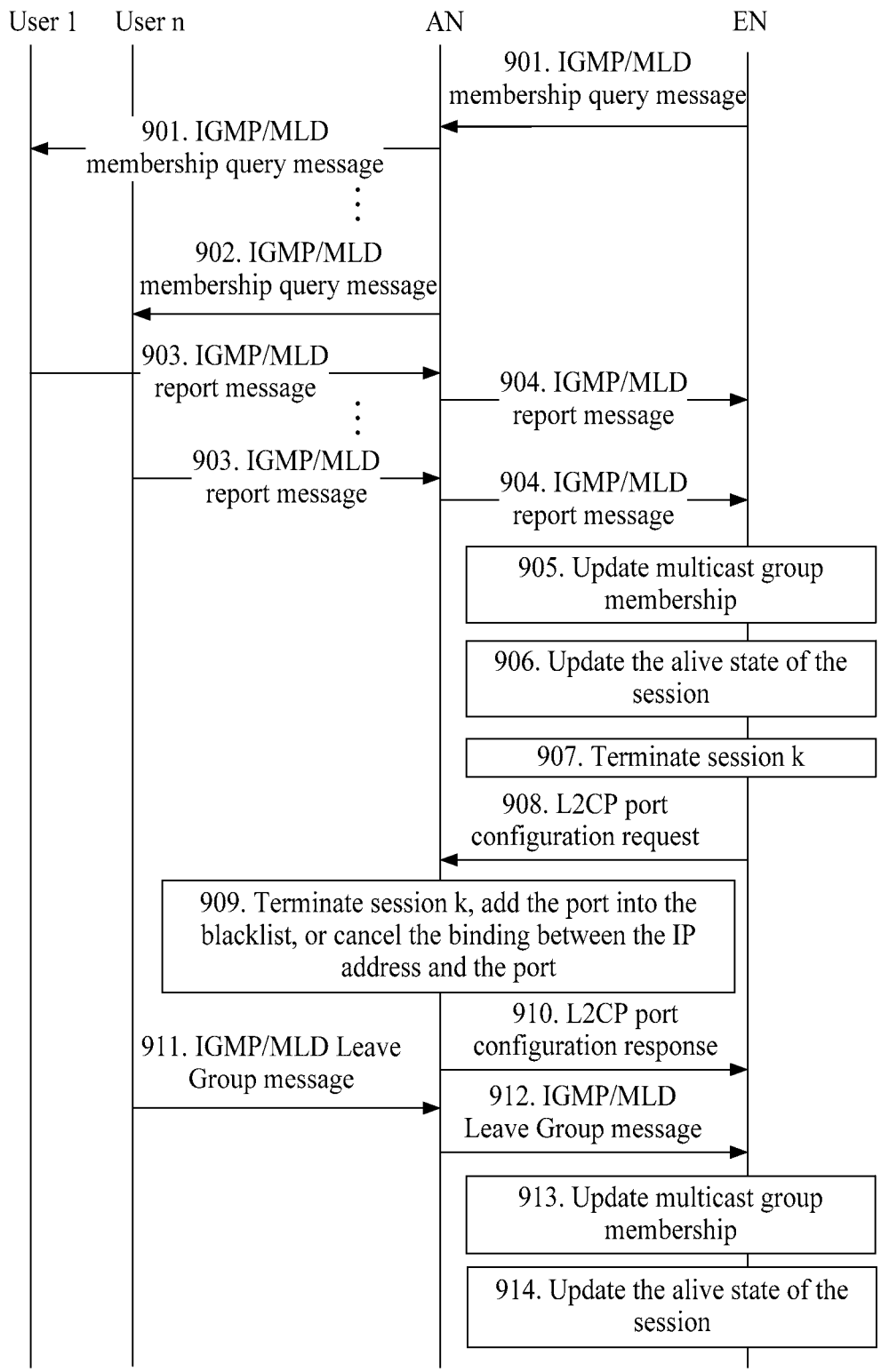
FIG. 9 is a flowchart of monitoring IP sessions or IP multicast sessions based on multicast technologies in a fourth embodiment of the present invention.

FIG. 9 is a flowchart of monitoring IP sessions or IP multicast sessions based on multicast technologies in the session communication process in the first embodiment of the present invention. The process may include the following steps:

Steps 901-903 are similar to steps 601-603 described above.

Step 904: The AN supports the listening function of the multicast management protocol, and forwards the received report message to the EN according to the relation between the user port (physical port or logical port) and the address of the specific multicast group in the IP session or IP multicast session in the ACL.

In the fourth embodiment, the AN does not need to maintain the information about the members of the multicast group in the IP session or IP multicast session, but forwards the report message to the EN directly.

Step 905: The EN updates the multicast group membership.

The EN receives the report message, extracts the member information from the report message, adds the corresponding user into the address of a specific multicast group in the IP session or IP multicast session, and maintains the membership table of the specific multicast group.

The EN counts how many times the user responds to the member query message sent by the EN. If the user fails to respond to the member query message sent by the EN for a number of consecutive times, and the number of consecutive times reaches a set threshold, the EN deletes the user from the membership table of the specific multicast group.

Step 906: The EN updates the keepalive state of the IP session or IP multicast session.

According to the membership table between the user and the address of the specific multicast group in the IP session or IP multicast session, the EN judges whether the IP session of the corresponding user of the corresponding IP session group is alive or whether the member user of the IP multicast session is alive to update the keepalive state of the corresponding IP session or IP multicast session. The judgment criteria are as follows:

If a user does not exist in the membership table or the user fails to appear in the membership table for a set number of consecutive times, the EN determines that the corresponding IP session is not alive or the corresponding member user of the IP multicast session is not alive; otherwise, the EN determines that the IP session is alive or the member user of the IP multicast session is alive.

Steps 907-911 are similar to steps 607-611 in the second embodiment.

Step 912: After receiving the Leave Group message sent by the user, the AN forwards the Leave Group message to the EN.

In the fourth embodiment, the AN does not need to maintain the information about the members of the multicast group in the IP session or IP multicast session, but forwards the Leave Group message to the EN directly.

Step 913: After receiving the Leave Group message forwarded by the AN, the EN updates the stored information about the members of the multicast group in the IP session or IP multicast session.

In the fourth embodiment, the EN updates the information about the members of the multicast group in the IP session or IP multicast session in the way similar to the mode of the AN updating the member information in the first embodiment. That is, the EN parses the Leave Group message to obtain the user information and the address of the multicast group in the IP session or IP multicast session in the message, and deletes the user information from the stored information about the members of the multicast group in the IP session or IP multicast session.

Step 914 is similar to step 906, in which the EN updates the keepalive state of the IP session or IP multicast session.

For step 914, if the IP multicast session has no member user, it is necessary to terminate the IP multicast session and release the resources allocated to the IP multicast session.

The process of the fourth embodiment ends.

In the fourth embodiment, the EN determines whether the IP session between the EN and the user is alive or whether the member user of the IP multicast session is alive by monitoring the information about the members of the multicast group in the IP session or IP multicast session according to the preset address of the multicast group in the IP session or IP multicast session. In this way, the network monitors the IP session or IP multicast session between the network and the user based on the multicast technologies supported by both parties.

Fifth Embodiment

In the session communication process in the fifth embodiment, when the EN wants to know whether the IP session with a specified user is alive or whether a specified member user of an IP multicast session is alive, the EN sends a unicast frame that carries a query message, and the AN forwards the unicast frame to the user. In the fifth embodiment, it is assumed that the AN reports the information about the members of the multicast group in the IP session or IP multicast session to the EN.

Figure 10:
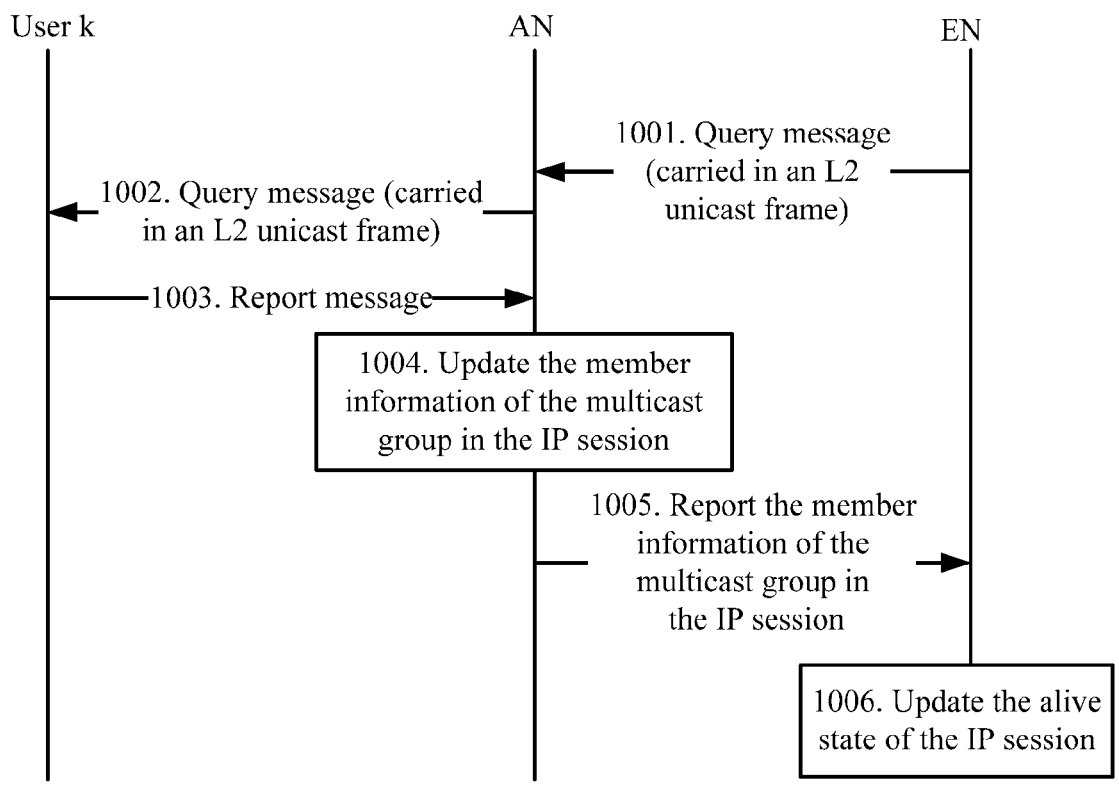
FIG. 10 is a flowchart of monitoring IP sessions or IP multicast sessions based on multicast technologies in a fifth embodiment of the present invention.

FIG. 10 is a flowchart of monitoring an IP session or an IP multicast session based on multicast technologies in the fifth embodiment of the present invention. The process may include the following steps:

Step 1001: The EN sends a query message carried in a layer-2 unicast frame to the user through the AN.

In the unicast frame that carries the query message in the fifth embodiment, the destination MAC address is the MAC address of the specified user. Therefore, the query message is not sent to all users, and the waste of resources is avoided.

Step 1002: After receiving the unicast frame, the AN does not replicate the query message, but forwards the layer-2 unicast frame that carries the query message to the specified user directly.

Steps 1003-1006 are similar to steps 603-606 in the second embodiment.

The process of the fifth embodiment ends.

In the session communication process in the fifth embodiment, to query whether the IP session between the network and a specified user is alive or whether a member user in a specific IP multicast session is alive, the EN adds a query message into a Layer-2 unicast frame so that the query message is sent to the specified user instead of all users. Therefore, the resources are saved, and it is convenient to detect the keepalive state of the IP session or IP multicast session between the EN and the specified user in the actual application.

Sixth Embodiment

Similar to the third embodiment described above, in the session communication process in the sixth embodiment, when the EN wants to know whether the IP session with a user is alive or whether a specified member user of an IP multicast session is alive, the EN obtains the information about the members of the multicast group in the IP session or IP multicast session actively.

Figure 11:
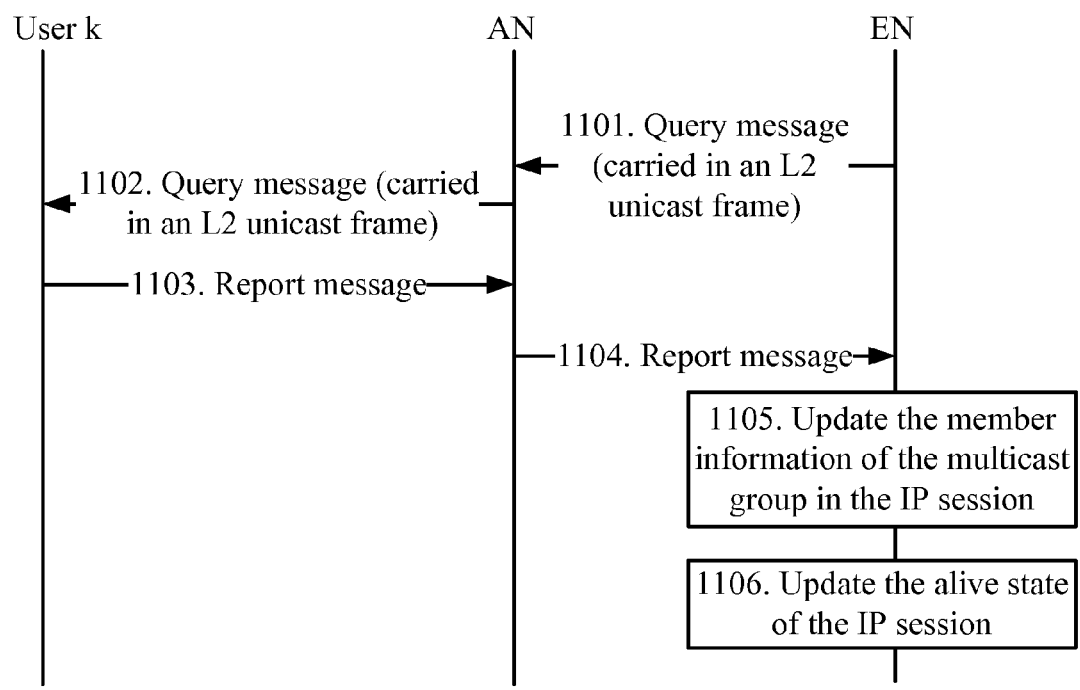
FIG. 11 is a flowchart of monitoring IP sessions or IP multicast sessions based on multicast technologies in a sixth embodiment of the present invention.

FIG. 11 is a flowchart of monitoring IP sessions or IP multicast sessions based on multicast technologies in the sixth embodiment of the present invention. Because the steps of this process are partially the same as the process in the third embodiment and the fifth embodiment described above, this process is described briefly below. In FIG. 11, steps 1101-1102 are similar to steps 1001-1002 above; steps 1103-1106 are similar to steps 703-706 in the third embodiment.

In the four embodiments above, the user returns a report message to the network after receiving a query message sent by the network. In practice, the user may submit the report message periodically, depending on the setting.

In conclusion, the technical solution provided herein is based on multicast technologies. A multicast group that can be joined by a user in an IP session is set beforehand, or the multicast group in an IP multicast session corresponding to an IPTV multicast service channel joined by the user is set beforehand. By monitoring the information about the members of the multicast group in the IP session or IP multicast session, the network knows whether the IP session between the network and the member of the multicast group in the IP session is alive or whether a member user of the IP multicast session is alive. If the information about the members of the multicast group in the IP session or IP multicast session includes the user information corresponding to the user, it is determined that the IP session between the network and the user is alive or the member user of the IP multicast session is alive. In this way, the keepalive state of the IP session or IP multicast session is detected based on multicast technologies. For the UE that does not support the existing IP session or IP multicast session detection mechanism (for example, BFD), the embodiments of present invention can also detect the keepalive state of the IP session or IP multicast session.

In the embodiments of the present invention, the AN may obtain the information about the members of the multicast group in the IP session or IP multicast session, and send the obtained member information to the EN, and the EN monitors the IP session or IP multicast session according to the received information about the members of the multicast group in the IP session or IP multicast session. Because the AN obtains the information about the members of the multicast group in the IP session or IP multicast session actively, the messages that need to be transmitted between the AN and the EN are reduced massively, the load on the EN is reduced massively, and the system performance is improved.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as a CD-ROM, a USB disk, or a mobile hard disk), and may include several instructions that enable a computer device (such as a personal computer, a server, or a network device) to perform the methods provided in the embodiments of the present invention.

The above descriptions are merely exemplary embodiments of the present invention, but not intended to limit the scope of the present invention. Any modification, equivalent replacement, or improvement made without departing from the spirit and principle of the present invention should fall within the scope of the present invention.

What is claimed is:

1. A session monitoring method based on multicast technologies, comprising:
   setting a specific multicast group in an Internet Protocol (IP) session dynamically or statically in an Edge Node (EN) and a User Equipment (UE) in a stage of setting up an IP session;
   joining by a user, the specific multicast group in the IP session;
   monitoring by an Access Node (AN): members of the specific multicast group in the IP session, and reporting obtained information about the members of the specific multicast group in the IP session to the EN;
   obtaining by the EN, the obtained information about the members of the specific multicast group in the IP session reported from the AN;
   updating by the EN, keepalive states of member users of an IP session group;
   wherein the IP session group corresponds to the specific multicast group in the IP session, a member user of the IP session group corresponds to a member of the specific multicast group in the IP session; and
   wherein the IP session group is defined by any one of:
      multiple IP sessions on multiple physical lines that pass through the same AN to a Customer Premises Equipment (CPE),
      multiple IP sessions on multiple physical lines that pass through the same AN to a Routing Gateway (RG),
      multiple IP sessions on multiple physical lines from the same AN to a UE, or
      multiple IP sessions on the same physical line that passes through the AN to a UE, and wherein each IP session of the multiple IP sessions is a unicast session, each IP session of the multiple IP sessions is the member user of the IP session group;
if the user has joined the specific multicast group in the IP session and becomes the member of the specific multicast group in the IP session, the keepalive state of the unicast IP session between the user and the EN is alive.

2. The method of claim 1, wherein the updating of the keepalive states of the member users of the IP session group comprising:
   determining, by the EN, that the corresponding IP session is not alive, if a user does not exist in a membership table or the user fails to appear in the membership table for a set number of consecutive times.

3. The method of claim 1, wherein before the obtaining of the information about the members of the specific multicast group in the IP session, the method further comprising:
   reporting through the L2C protocol, by the AN, the content of a membership table of relationship between the user and the specific multicast group in the IP session to the EN.

4. The method of claim 2, wherein before the of obtaining the information about the members of the specific multicast group in the IP session, the method further comprising:
   reporting through the L2C protocol, by the AN, the content of a membership table of relationship between the user and the specific multicast group in the IP session to the EN.

* * * * *